(12) United States Patent
Hashimoto et al.

(10) Patent No.: US 9,756,162 B2
(45) Date of Patent: Sep. 5, 2017

(54) ELECTRONIC DEVICE AND CONTROL METHOD

(71) Applicant: KYOCERA Corporation, Kyoto-shi, Kyoto (JP)

(72) Inventors: Osamu Hashimoto, Yokohama (JP); Mitsutaka Hata, Yokohama (JP); Akiko Watanabe, Hachioji (JP); Takaomi Araki, Yokohama (JP); Tomohiro Sudou, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/025,551

(22) PCT Filed: Sep. 5, 2014

(86) PCT No.: PCT/JP2014/073581
§ 371 (c)(1),
(2) Date: Mar. 29, 2016

(87) PCT Pub. No.: WO2015/045820
PCT Pub. Date: Apr. 2, 2015

(65) Prior Publication Data
US 2016/0241694 A1 Aug. 18, 2016

(30) Foreign Application Priority Data
Sep. 30, 2013 (JP) .................................. 2013-205490

(51) Int. Cl.
H04M 3/00 (2006.01)
H04M 1/60 (2006.01)
(Continued)

(52) U.S. Cl.
CPC ....... *H04M 1/6066* (2013.01); *H04M 1/7253* (2013.01); *H04W 4/008* (2013.01); *H04W 8/22* (2013.01); *H04M 1/72569* (2013.01)

(58) Field of Classification Search
CPC .. H04M 1/6066; H04M 1/7253; H04W 4/008
(Continued)

(56) References Cited

U.S. PATENT DOCUMENTS

2002/0115478 A1* 8/2002 Fujisawa ............. H04M 1/6505
455/567
2005/0266843 A1* 12/2005 Shimominami ........ H04W 8/04
455/432.3

FOREIGN PATENT DOCUMENTS

| JP | 11-205475 A | 7/1999 |
| JP | 2003-134224 A | 5/2003 |
| JP | 2012-199640 A | 10/2012 |

OTHER PUBLICATIONS

International Search Report mailed Dec. 9, 2014, in International Application No. PCT/JP2014/073581.

* cited by examiner

*Primary Examiner* — Nghi H Ly
(74) *Attorney, Agent, or Firm* — Hauptman Ham, LLP

(57) ABSTRACT

A mobile phone includes a communication module for establishing a master-slave relationship with another electronic device to perform communication. The mobile phone determines a carrying state and performs control related to the master-slave relationship of the communication module based on a determination result of the carrying state. By this configuration, the mobile phone can improve user's convenience with respect to the use modes of electronic devices between which the master-slave relationship is established. For example, when it is determined that the carrying state is
(Continued)

a carried state, the mobile phone may make the communication module subordinate to the other electronic device.

8 Claims, 9 Drawing Sheets

(51) Int. Cl.
*H04M 1/725* (2006.01)
*H04W 4/00* (2009.01)
*H04W 8/22* (2009.01)

(58) Field of Classification Search
USPC .............. 455/418, 414.1, 550.1, 422.1, 518
See application file for complete search history.

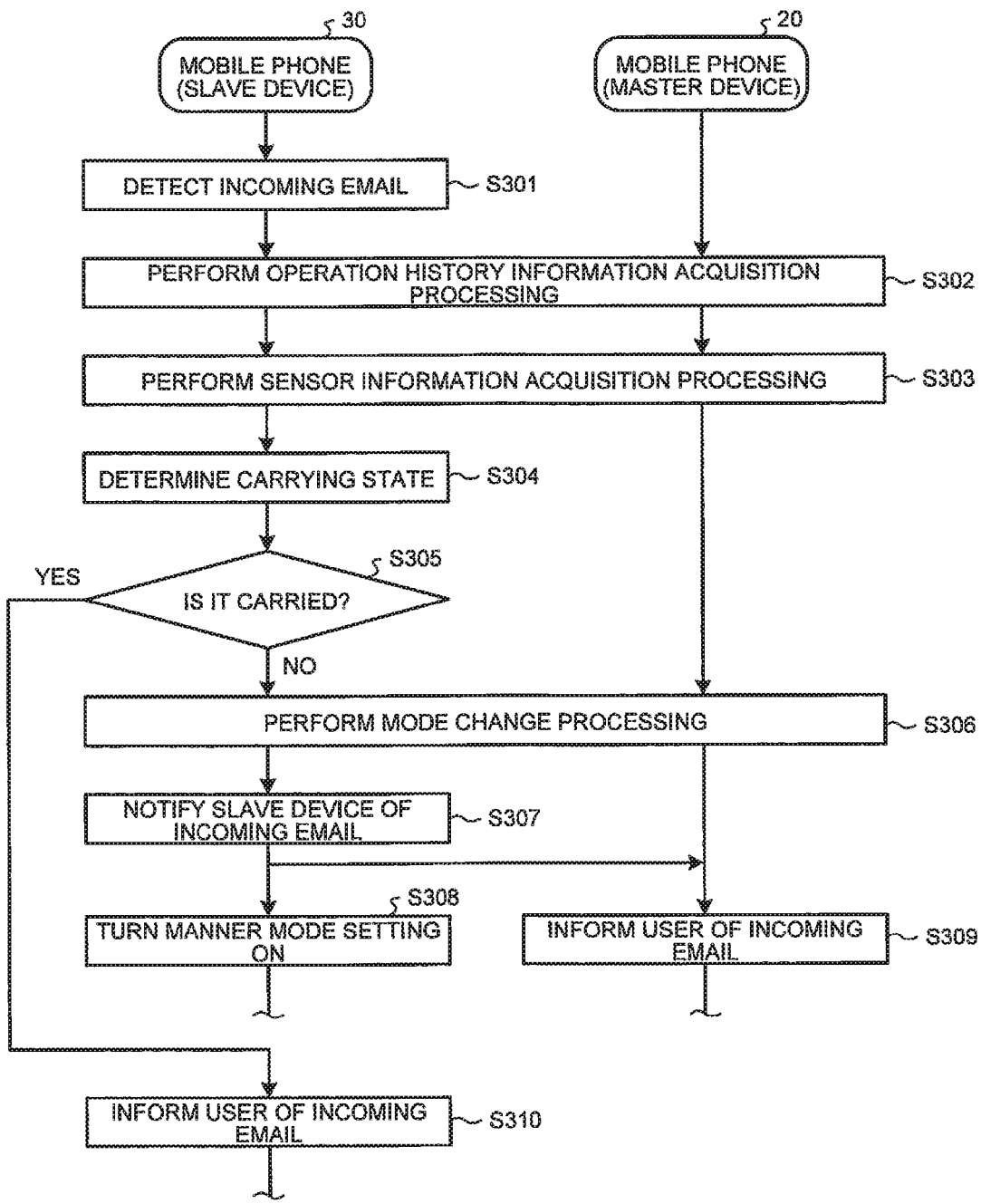

ND CONTROL METHOD

ELECTRONIC DEVICE AND CONTROL METHOD

RELATED APPLICATIONS

The present application is a National Phase entry of International Application No. PCT/JP2014/073581, filed Sep. 5, 2014, which claims priority of Japanese Application No. 2013-205490, filed Sep. 30, 2013.

FIELD

The present application relates to an electronic device and a control method.

BACKGROUND

A technology for performing, when an incoming call is received by a mobile phone, a telephone communication for the incoming call using other electronic device is known. A separation type mobile phone of a wireless headset type provided with a wireless module corresponding to, for example, Bluetooth (registered trademark) is proposed. The technology allows a user to make or receive a phone call while a headset is worn on his/her ear with a phone body being placed in a bag (see Patent Literature 1).

CITATION LIST

Patent Literature

Patent Literature 1: Japanese Laid-open Patent Publication No. 2003-134224

SUMMARY

Technical Problem

In the technology, a master-slave relationship is established between electronic devices connected to each other. Therefore, use modes of the electronic devices between which the master-slave relationship is established may be inconvenient caused by occurrence of restrictions thereto. For the foregoing reasons, there is a need for an electronic device and a control method capable of improving user's convenience with respect to the use modes of electronic devices between which the master-slave relationship is established.

Solution to Problem

In one aspect according to the present invention, there is provided an electronic device comprising: a first communication module for establishing a master-slave relationship with another electronic device to perform communication; and a controller for determining a carrying state and performing control related to the master-slave relationship of the first communication module based on a determination result of the carrying state.

In another aspect according to the present invention, there is provided a control method for an electronic device including a first communication module, the control method comprising: a step of establishing a master-slave relationship in the first communication module with another electronic device to perform communication; and a step of determining a carrying state and performing control related to the master-slave relationship of the first communication module based on a determination result of the carrying state.

BRIEF DESCRIPTION OF DRAWINGS

FIG. 9 is a sequence diagram illustrating operations when a slave device receives an email.

DESCRIPTION OF EMBODIMENTS

Exemplary embodiments for implementing the electronic device and the control method according to the present application will be explained in detail below with reference to the accompanying drawings.

Embodiment

Figure 1:
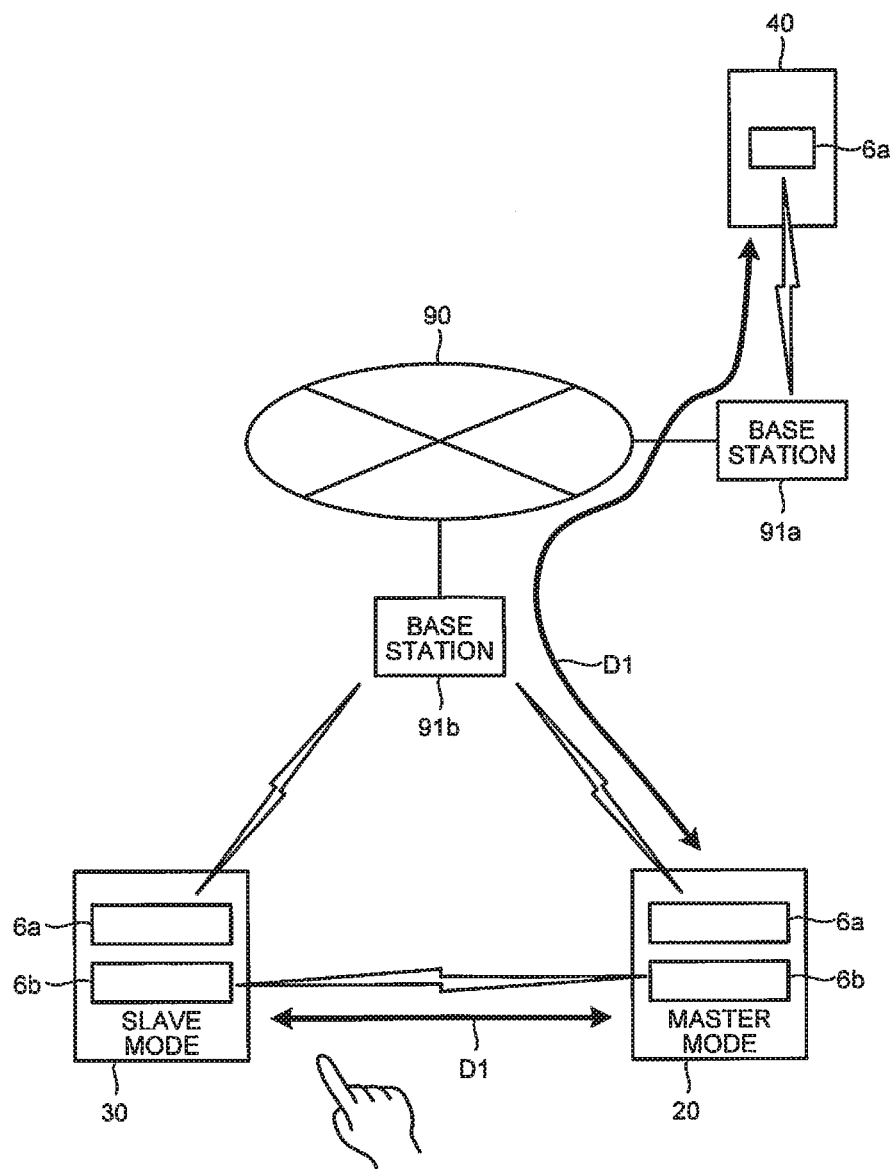
FIG. 1 is a diagram illustrating an example of notification of an incoming call.
Figure 2:
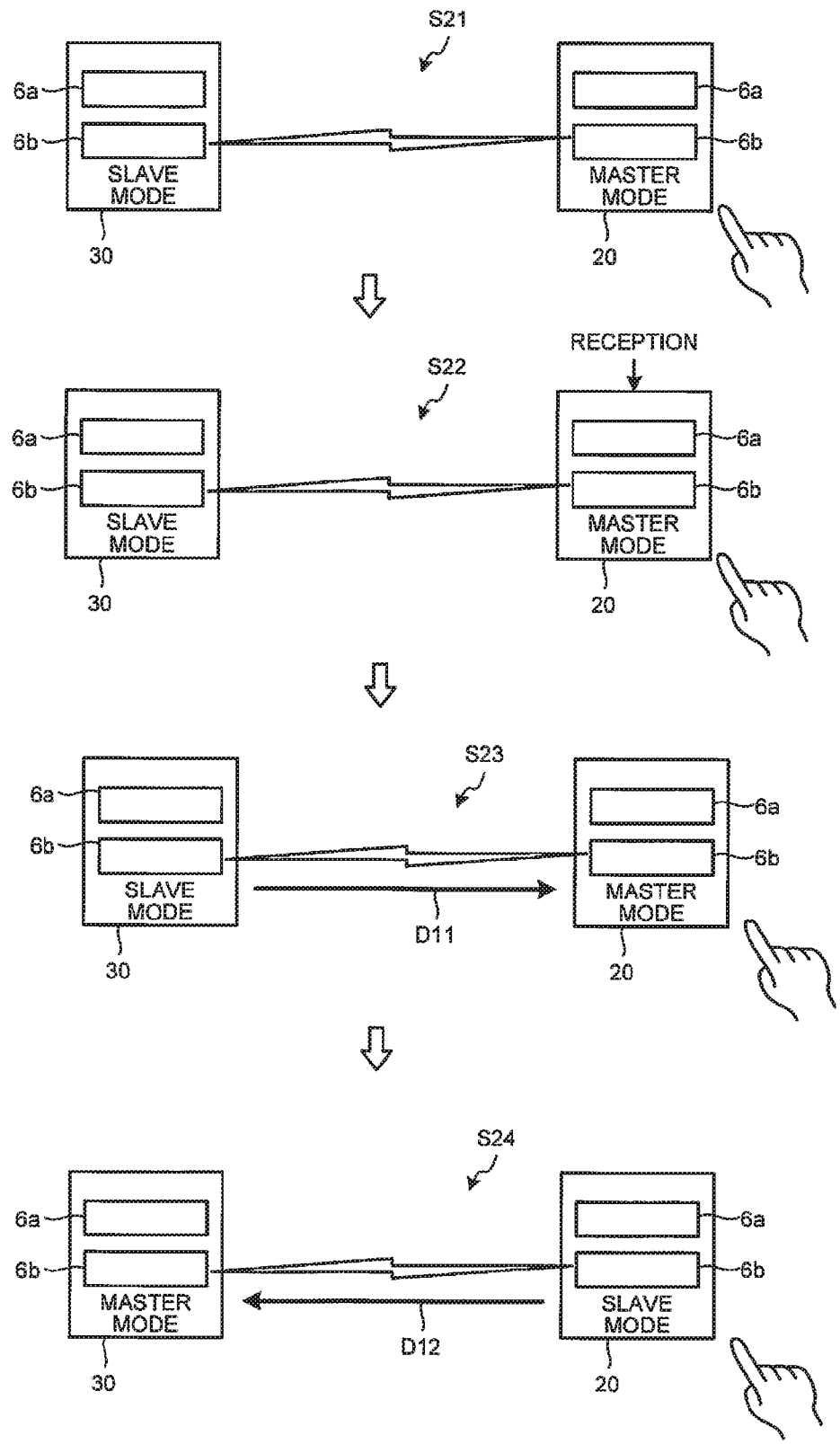
FIG. 2 is a diagram illustrating an example of how to change a master-slave relationship.
Figure 3:
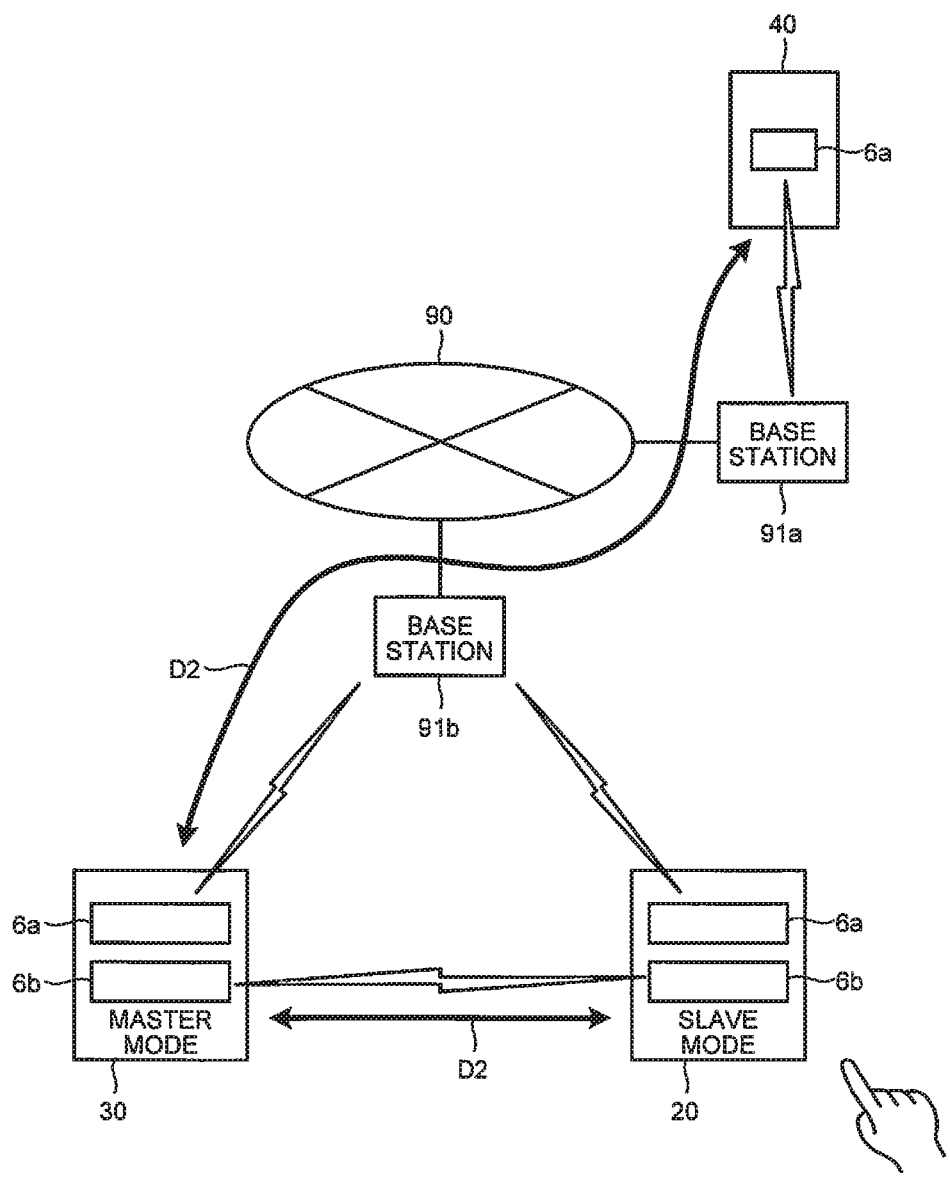
FIG. 3 is a diagram illustrating an example of notification of the incoming call after the change of the master-slave relationship.

A control method according to an embodiment will be explained with reference to FIG. 1 to FIG. 3. FIG. 1 is a diagram illustrating an example of notification of an incoming call. FIG. 2 is a diagram illustrating an example of how to change a master-slave relationship. FIG. 3 is a diagram illustrating an example of notification of the incoming call after the change. Mobile phones 20, 30, and 40 illustrated in FIG. 1 include communication modules 6a respectively. The mobile phones 20 and 30 further include communication modules 6b respectively.

The communication module 6a is configured so as to be able to make a call through a public line network 90. In the situation illustrated in FIG. 1, the communication modules 6a of the mobile phones 20 and 30 are connected to the public line (carrier line) network 90 via wireless communication with a base station 91b. In the situation illustrated in FIG. 1, the communication module 6a of the mobile phone 40 is connected to the public line network 90 via wireless communication with a base station 91a.

The communication module 6b is configured so as to be able to forward call voice data received by the communication module 6a. The communication module 6b is directly connected to another electronic device through short-distance wireless communication. A short-distance wireless communication system for directly connecting to another electronic device includes, for example, Bluetooth (registered trademark) and WiFi (registered trademark). In the example illustrated in FIG. 1, the mobile phone 20 and the mobile phone 30 are directly communicating without via the public line network 90. In the situation illustrated in FIG. 1, the communication modules 6b of the mobile phones 20 and 30 are connected to each other in a mutually communicable state. In the example illustrated in FIG. 1, the mobile phone 20 connects the communication module 6b to the mobile phone 30 by using master mode in which the connection is made by subordinating the other electronic device. In the example illustrated in FIG. 1, the mobile phone 30 connects the communication module 6b to the mobile phone 20 by using slave mode in which the connection is made by being subordinate to the other electronic device. The master-slave relationship is established between the mobile phone 20 and the mobile phone 30.

The mobile phones 20 and 30 are owned by, for example, the same user. Generally, when carrying the two mobile phones 20 and 30, the user carries one of them for operation and carries the other one as a repeater in a bag or the like. In the situation illustrated in FIG. 1, the user carries the mobile phone 30 set in the slave mode and carries the mobile phone 20 set in the master mode in a bag or the like. Carrying the mobile phone 30 includes, for example, that the mobile phone 30 is kept by the user, that the user holds the mobile phone 30 in his/her hand, and that the user is operating the mobile phone 30. In the situation illustrated in FIG. 1, the mobile phone 30 is a target to be operated by the user. The mobile phone 20 is not the target to be operated by the user but functions as a repeater. The mobile phone 20 and the mobile phone 30 are set so as to notify, when an incoming call in the master mode is received, the mobile phone as a connection partner of the incoming call through the short-distance wireless communication performed by the communication module 6b.

As illustrated in FIG. 1, for example, when the mobile phone 40 makes an outgoing call to the mobile phone 20, the outgoing call reaches the mobile phone 20 via the base station 91a, the public line network 90, and the base station 91b. When detecting the incoming call, the mobile phone 20 notifies the mobile phone 30 as a connection partner of the incoming call through the short-distance wireless communication performed by the communication module 6b. When the incoming call is notified from the mobile phone 20, the mobile phone 30 informs the user of the incoming call using a ringtone, vibration, blinking of a lamp, or the like.

When the user having noticed the information performs a predetermined off-hook operation on the mobile phone 30, a call between the mobile phone 20 and the mobile phone 40 is started. The off-hook operation is an operation for starting a call in response to an incoming call. The mobile phone 20 relays voice data D1 from the mobile phone 30 or from the mobile phone 40 to the other during the call. When an on-hook operation is performed on the mobile phone 30 during the call, the mobile phone 20 disconnects the connection for the call with the mobile phone 40. The on-hook operation is an operation for ending the call in response to the incoming call.

When detecting the incoming call with specifying a phone number allocated to its own device, the mobile phone 30 also informs the user of the incoming call using a ringtone, vibration, blinking of a lamp, or the like. Then, when the user having noticed the information performs the predetermined off-hook operation, a call between the mobile phone 30 and an electronic device of a caller (e.g., mobile phone) is started. In this case, voice data exchanged between the mobile phone 30 and the electronic device of the caller (e.g., any mobile phone other than the mobile phone 40) will not be relayed by the mobile phone 20 which is the connection partner of the mobile phone 30.

In the situation illustrated in FIG. 2, the user takes the mobile phone 20 set in the master mode from the bag or the like to hold it and places the mobile phone 30 set in the slave mode in the bag or the like. In this case, the user changes the target to be operated from the mobile phone 30 to the mobile phone 20 but does not change the master-slave relationship between the mobile phone 20 and the mobile phone 30. That is, the user carries the mobile phone 20 in the master mode. At Step S21, when detecting a user's operation, the mobile phone 20 stores the operation as an operation history. For example, when the user performs an operation of displaying a WEB page, the mobile phone 20 stores an operation time and operation details indicating a display of the WEB page.

At Step S22, when detecting the reception via the base station 91b, the mobile phone 20 requests the transmission of the operation history from the mobile phone 30 through the short-distance wireless communication performed by the communication module 6b. At Step S23, the mobile phone 30 transmits operation history information D11 indicating the operation history of the mobile phone 30 to the mobile phone 20 in response to the reception of the request through the short-distance wireless communication performed by the communication module 6b.

When receiving the operation history information D11 of the mobile phone 30, then at Step S24, the mobile phone 20 determines a carrying state based on the operation histories of the own device and of the mobile phone 30. The carrying state includes a state in which the mobile phone is carried by the user and a state in which the mobile phone is not carried by the user. The method of determining the carrying state is not particularly limited. The present embodiment will explain a case where the mobile phone 20 determines that the last operated mobile phone out of the mobile phone 20 and the mobile phone 30 is in a carried state.

In the situation illustrated in FIG. 2, the user operates the mobile phone 20 in the master mode at Step S21 and carries the mobile phone 20 even after the operation. The mobile phone 30 is placed in the bag or the like. In this case, the mobile phone 20 is operated by the user after operating the mobile phone 30. As a result, the mobile phone 20 determines that the mobile phone carried by the user is the mobile phone 20 based on the operation histories of the mobile phone 20 and of the mobile phone 30. At Step S24, the mobile phone 20 changes the mode of the own device from the master mode to the slave mode, and transmits a change request D12 of the mode to the mobile phone 30 through the short-distance wireless communication performed by the communication module 6b.

When receiving the change request D12, the mobile phone 30 changes the mode of the own device from the slave mode to the master mode. Thereby, the setting modes are changed between the mobile phone 20 and the mobile phone 30. In other words, the master-slave relationship between the mobile phone 20 and the mobile phone 30 is changed.

FIG. 3 is a diagram illustrating an example of notification of the incoming call after the change of the master-slave relationship. As illustrated in FIG. 3, the slave mode is set to the mobile phone 20 carried by the user. The mobile phone 20 connects the communication module 6b to the mobile phone 30 by using the slave mode. As illustrated in FIG. 3, the master mode is set to the mobile phone 30. The mobile phone 30 connects the communication module 6b to the mobile phone 20 by using the master mode.

When an incoming call is received, the mobile phone 30 notifies the mobile phone 20 of the incoming call through the short-distance wireless communication performed by the communication module 6b.

As illustrated in FIG. 3, for example, when the mobile phone 40 makes an outgoing call to the mobile phone 30, the outgoing call reaches the mobile phone 30 via the base station 91a, the public line network 90, and the base station 91b. When detecting the incoming call, the mobile phone 30 notifies the mobile phone 20 as the connection partner of the incoming call through the short-distance wireless communication performed by the communication module 6b. When the incoming call is notified from the mobile phone 30, the mobile phone 20 informs the user of the incoming call using a ringtone, vibration, blinking of a lamp, or the like.

When the user having noticed the information performs the predetermined off-hook operation on the mobile phone 20, a call between the mobile phone 30 and the mobile phone 40 is started. The mobile phone 30 relays voice data D2 from the mobile phone 20 or from the mobile phone 40 to the other mobile phone during the call. When an on-hook operation is performed on the mobile phone 20, the mobile phone 30 disconnects the connection for the call with the mobile phone 40.

In this way, the mobile phone 20 determines a carrying state as to whether the user carries it, and performs the control related to the master-slave relationship between the communication modules 6b based on the result of determination. By performing the control in this manner, even if the carrying states of the mobile phone 20 and the mobile phone 30 are opposite to each other, the mobile phone 20 can automatically change the master-slave relationship according to the carrying state. For example, some kinds of roles are produced between the electronic devices between which the master-slave relationship is established. That is, some kinds of functional roles, one of which is to forward data received from the outside to the connection partner and the other of which is to receive the data forwarded from the connection partner, may be produced between the electronic devices connected to each other. In the example illustrated in FIG. 1, the incoming call to the mobile phone 20 set in the master mode is notified to the mobile phone 20 set in the slave mode. In the example illustrated in FIG. 3, the incoming call to the mobile phone 30 set in the master mode is notified to the mobile phone 20 set in the slave mode. In this case, when the state of the electronic device in the master mode is determined as carrying state by the user, the mode can be changed to the slave mode. As a result, the electronic devices eliminate the need for the user to change the master-slave relationship according to the change of the carrying state, thus improving the user's convenience with respect to the use modes of the electronic devices between which the master-slave relationship is established.

The configurations of the mobile phone 20 and the mobile phone 30 illustrated in FIG. 1 to FIG. 3 will be explained next with reference to FIG. 4 and FIG. 5. In the explanation herein below, the same reference signs may be assigned to those similar to the components. Moreover, overlapping explanation may be omitted.

Figure 4:
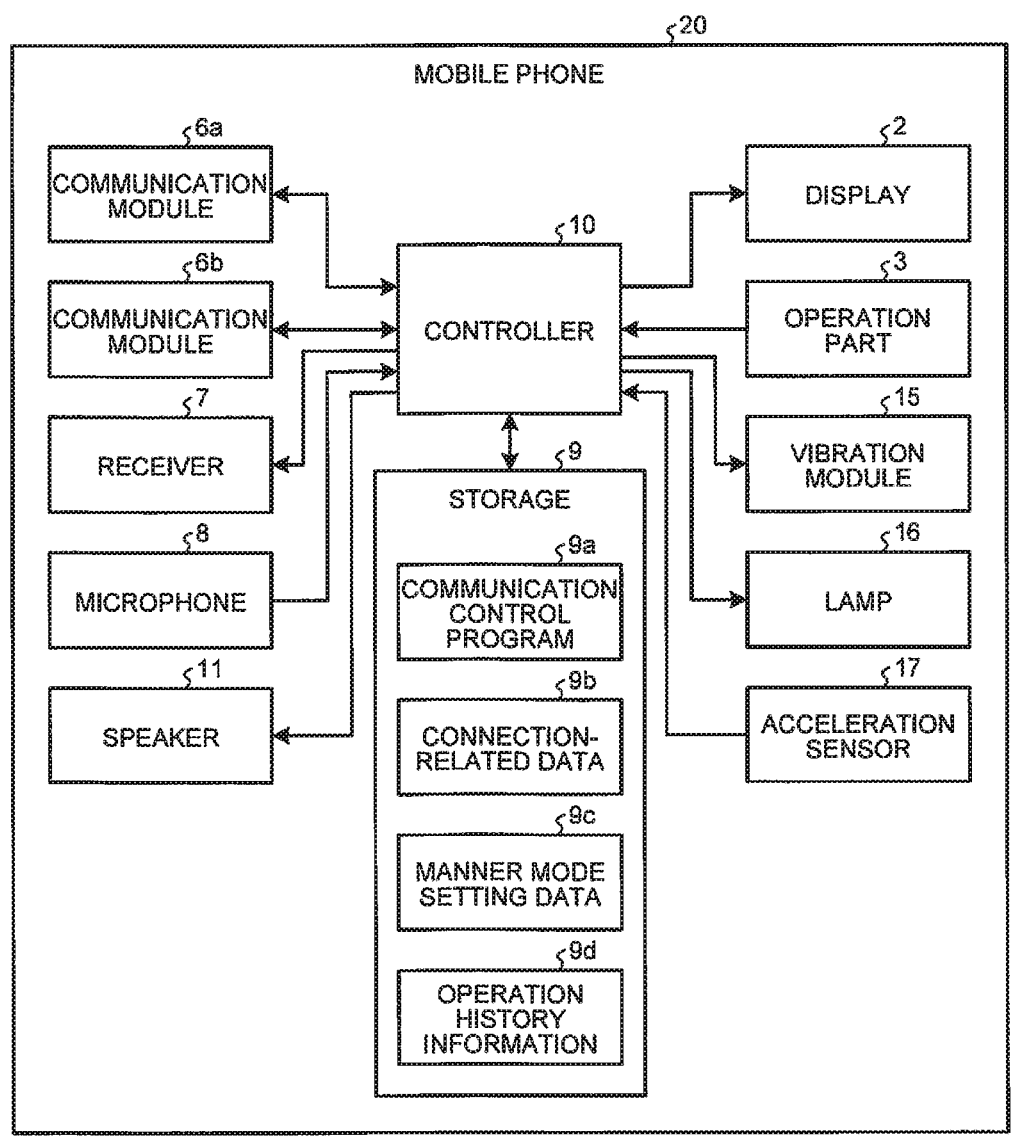
FIG. 4 is a block diagram of a mobile phone.

FIG. 4 is a block diagram of the mobile phone 20. As illustrated in FIG. 4, the mobile phone 20 includes a display 2, an operation part 3, a communication module 6a, a communication module 6b, a receiver 7, a microphone 8, a storage 9, a controller 10, a speaker 11, a vibration module 15, a lamp 16, and an acceleration sensor 17.

The display 2 includes a display panel such as a liquid crystal display and an organic electro-luminescence display. The display 2 displays information such as text, graphics, and images according to a signal input from the controller 10. The information displayed in the display 2 includes a screen image for notification, icons, and so on.

The operation part 3 includes one or more devices for a user's operation. The device for a user's operation includes, for example, a key, a button, and a touch screen. The operation part 3 inputs a signal according to the user's operation to the controller 10.

The communication module 6a is a communication module for performing communication using a first communication system. In the present embodiment, the first communication system is a communication system such as 2G, 3G, and 4G for performing communication via the public line network 90. A communication standard for performing communication via the public line network 90 includes, for example, LTE (Long Term Evolution), W-CDMA (Wideband Code Division Multiple Access), CDMA 2000, PDC (Personal Digital Cellular), GSM (registered trademark) (Global System for Mobile Communications), and PHS (Personal Handy-phone System). The first communication system may be a communication system for performing data communication via the public line network 90 like WiMAX (Worldwide Interoperability for Microwave Access). When the first communication system is a communication system for performing data communication, a phone call is implemented by combining a technology for data transmission with a technology, such as VoIP (Voice over Internet Protocol), for transmitting voice as data. The communication module 6a may support a plurality of communication systems for performing communication via the public line network 90.

The communication module 6b is a communication module for performing communication using a second communication system. In the present embodiment, the second communication system is a short-distance wireless communication system. The short-distance wireless communication system includes Bluetooth (registered trademark), wireless LAN (IEEE 802.11), ZigBee, infrared communication, visible light communication, NFC (Near Field Communication), and the like. The communication module 6b may support a plurality of short-distance wireless communication systems.

The receiver 7 and the speaker 11 are sound output modules. The receiver 7 and the speaker 11 output a sound signal input from the controller 10 as sound. The receiver 7 is used, for example, to output the voice of a call partner during a call. The speaker 11 is used, for example, to output a ringtone and music. One of the receiver 7 and the speaker 11 may also serve as the function of the other. The microphone 8 is a sound input module. The microphone 8 converts a user's voice or the like into a sound signal and inputs the sound signal to the controller 10.

The storage 9 stores programs and data. The storage 9 is used also as a work area that temporarily stores a processing result of the controller 10. The storage 9 may include any non-transitory storage medium such as a semiconductor storage medium and a magnetic storage medium. The storage 9 may include a plurality of types of storage mediums. The storage 9 may include a combination of a portable storage medium such as a memory card, an optical disk, or a magneto-optical disk with a reading device of the storage medium. The storage 9 may include a storage device used as a temporary storage area such as RAM (Random Access Memory).

The storage 9 stores, for example, a communication control program 9a, connection-related data 9b, manner mode setting data 9c, and operation history information 9d. The communication control program 9a provides a function of relaying voice data of a communication received by the communication module 6a to the other electronic device via the communication module 6b and also provides a function of determining a carrying state. The connection-related data 9b includes information on a connection with the other electronic device. The manner mode setting data 9c includes various pieces of information on settings of a manner mode.

The operation history information 9d includes various pieces of information on history of operations.

The communication control program 9a provides a function for wirelessly connecting the communication module 6b, to the other electronic device, by using one of the master mode in which the connection is made by subordinating the other electronic device and the slave mode in which the connection is made by being subordinate to the other electronic device. The communication control program 9a provides a function for switching between the master mode and the slave mode. The communication control program 9a provides an incoming call notification function for controlling notification of an incoming call in an electronic device in a master mode that performs notification of the incoming call. The communication control program 9a provides an incoming call information function for controlling information of an incoming call in an electronic device in a slave mode to which the incoming call is informed.

The connection-related data 9b includes, for example, information of it's own mode, information of a registration device for specifying an electronic device of a connection partner, information for specifying a type of the electronic device of the connection partner, and status information for specifying a connection status with the other electronic device. Registered in the own mode is a value corresponding to one of "master", "slave", and "no settings". Registered in the registration device are values such as a serial number and an MAC address uniquely assigned to the electronic device of the connection partner. Registered in the type is a combination of characters uniquely assigned to an electronic device to be connected. Registered in the status is a value corresponding to "connected" or "unconnected". The connection-related data 9b includes information on various types of settings for relaying of a communication.

Registered in the manner mode setting data 9c is a value corresponding to one of "manner mode", "silent mode", and "usual mode". The manner mode is a mode in which the vibration module 15 vibrates the device without outputting a notification sound and a ringtone. The silent mode is a mode in which only display is performed on the display 2 and in which a notification sound and a ringtone are not output and a vibration is not generated. The usual mode is a mode with a notification sound and a ringtone. The mobile phone 20 informs the user of reception of an email and an incoming call by performing processing in a corresponding set mode based on the manner mode setting data 9c.

The operation history information 9d stores information for operations performed on the mobile phone 20. The operation history information 9d includes items, for example, Operation Time and Operation Details. The operation history information 9d is configured to associate the Operation Time with the Operation Details. In the present embodiment, the case where the operation history information 9d includes the items of Operation Time and Operation Details will be explained; however, the embodiments are not limited thereto. The operation history information 9d may be configured to include, for example, only the item of Operation Time.

The items of the connection-related data 9b, the manner mode setting data 9c, and the operation history information 9d may be appropriately distributed or aggregated.

The controller 10 is a processor. Examples of the processor include, but are not limited to, a CPU (Central Processing Unit), SoC (System-on-a-chip), an MCU (Micro Control Unit), an FPGA (Field-Programmable Gate Array), and a coprocessor. The controller 10 integrally controls the operations of the mobile phone 20 to implement the various functions.

Specifically, the controller 10 executes commands contained in the program stored in the storage 9 while referring to the data stored in the storage 9 as necessary. The controller 10 then controls a function module according to the data and the commands and thereby implements the various functions. Examples of the function module include, but are not limited to, the display 2, the communication modules 6a and 6b, the receiver 7, the speaker 11, the vibration module 15, and the lamp 16. The controller 10 can change the control according to the detection result of a detector. Examples of the detector include, but are not limited to, the operation part 3, the communication modules 6a and 6b, the microphone 8, and the acceleration sensor 17.

The controller 10 executes the communication control program 9a, and thereby performs the operations of the mobile phone 20 in the communication control method illustrated in FIG. 1 and FIG. 2.

For example, when the communication module 6b in the master mode is to be wirelessly connected to the other electronic device, the controller 10 controls the operation of the communication module 6b in the master mode so that the communication module 6b is connected to the other electronic device. Then, when the communication module 6b in the master mode is connected to the other electronic device, the controller 10 notifies the mobile phone 30 of the incoming call through the short-distance wireless communication performed by the communication module 6b. For example, when the communication module 6b in the slave mode is to be connected to the other electronic device, the controller 10 controls the operation of the communication module 6b in the slave mode so that the communication module 6b is connected to the other electronic device. Then, when the communication module 6b in the slave mode is connected to the other electronic device, the controller 10 informs the user of the incoming call informed from the other electronic device using a ringtone, vibration, blinking of a lamp, or the like. When the master-slave relationship is to be switched, the controller 10 switches the modes and initializes the communication module 6b.

The vibration module 15 vibrates the mobile phone 20. The vibration module 15 uses, for example, a piezoelectric element or an eccentric motor in order to vibrate the mobile phone 20. The lamp 16 emits light in set color and pattern. The lamp 16 has a light source such as LED (Light Emitting Diode), and is mounted on the mobile phone 20 so that the light emitted from the light source can be visually recognized from the outside. The acceleration sensor 17 detects a direction and a magnitude of acceleration applied to the mobile phone 20. The detection result of the acceleration sensor 17 is stored in the storage 9 or the like, along with detection results for a predetermined retroactive time period as sensor information. The display 2, the speaker 11, the vibration module 15, and the lamp 16 are used to inform the user of an incoming phone call, mail reception, arrival of the time registered in a schedule, and the like.

The functional configuration of the mobile phone 20 illustrated in FIG. 4 is only an example, and therefore it can be modified as required within a scope that does not depart from the gist of the present invention.

Figure 5:
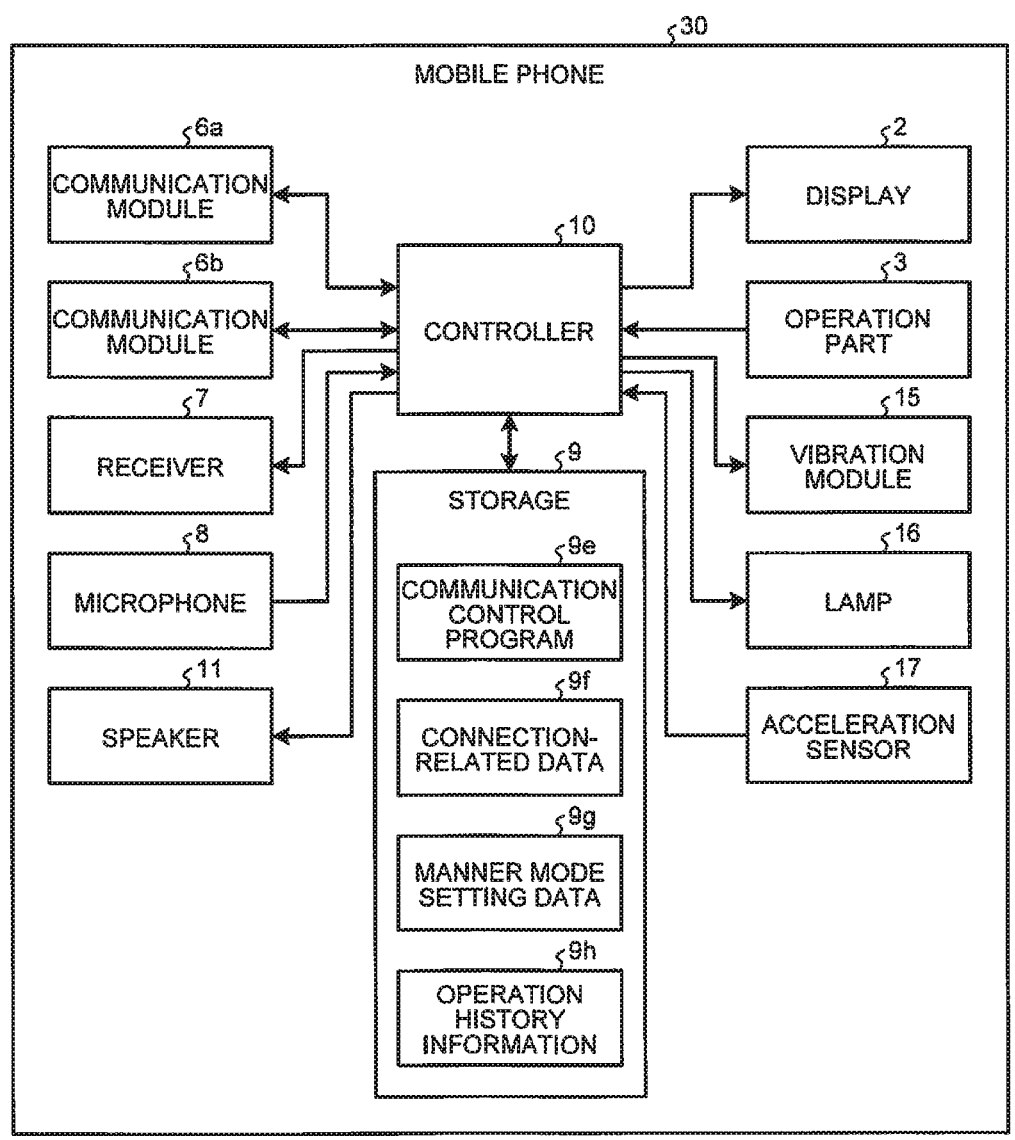
FIG. 5 is a block diagram of another mobile phone.

FIG. 5 is a block diagram of the other mobile phone 30. As illustrated in FIG. 5, the mobile phone 30 includes the display 2, the operation part 3, the communication module 6a, the communication module 6b, the receiver 7, the microphone 8, the storage 9, the controller 10, the speaker 11, the vibration module 15, the lamp 16, and the acceleration sensor 17.

The storage 9 stores, for example, a communication control program 9e, connection-related data 9f, manner mode setting data 9g, and operation history information 9h. The communication control program 9e provides a function of relaying voice data of a communication received by the communication module 6a to the other electronic device via the communication module 6b and also provides a function of determining a carrying state. Each of the communication control program 9e, the connection-related data 9f, the manner mode setting data 9g, and the operation history information 9h has the same configuration as that of the communication control program 9a, the connection-related data 9b, the manner mode setting data 9c, and the operation history information 9d of the mobile phone 20.

The controller 10 executes the communication control program 9e, and thereby performs the operations of the mobile phone 30 in the communication control method illustrated in FIG. 1 and FIG. 2.

In the mobile phone 20 and the mobile phone 30, the display 2, the speaker 11, the vibration module 15, and the lamp 16 function as an informing module for informing the user of an incoming phone call, mail reception, arrival of the time registered in a schedule, and the like.

Figure 6:
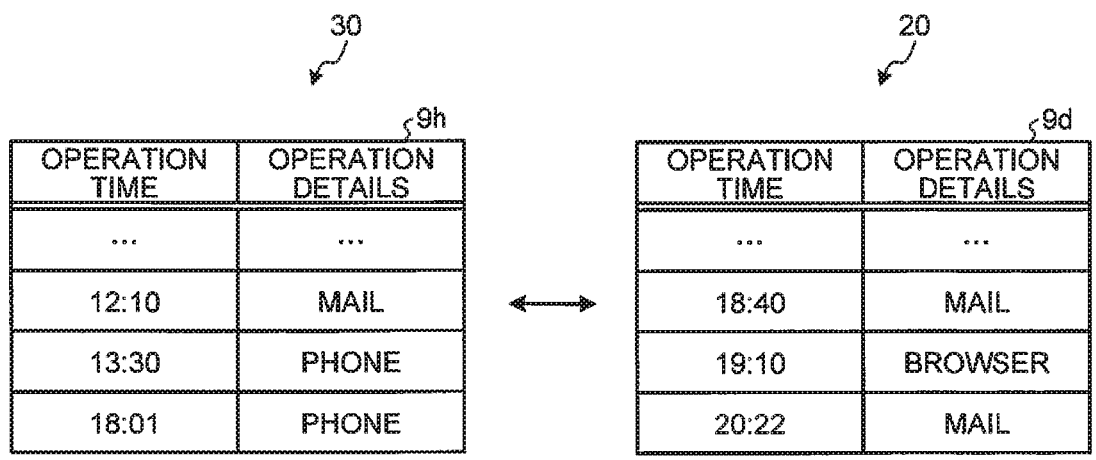
FIG. 6 is a diagram illustrating an example of operation history information.

The operation history information 9d and the operation history information 9h will be explained below with reference to FIG. 6. FIG. 6 is a diagram illustrating an example of operation history information. As illustrated in FIG. 6, the operation history information 9d and the operation history information 9h include items such as Operation Time and Operation Details. A value indicating a time at which the user performs an operation is set in the item of Operation Time. A value indicating details operated by the user is set in the item of Operation Details.

In the example illustrated in FIG. 6, the operation history information 9h of the mobile phone 30 includes pieces of information corresponding to "18:01", "13:30", and "12:10". In the last information, "18:01" is set in the item of Operation Time and "Phone" is set in the item of Operation Details. In the information one before the last, "13:30" is set in the item of Operation Time and "Phone" is set in the item of Operation Details. In the information two before the last, "12:10" is set in the item of Operation Time and "Mail" is set in the item of Operation Details.

In the example illustrated in FIG. 6, the operation history information 9d of the mobile phone 20 includes pieces of information corresponding to "20:22", "19:10", and "18:40". In the last information, "20:22" is set in the item of Operation Time and "Mail" is set in the item of Operation Details. In the information one before the last, "19:10" is set in the item of Operation Time and "Browser" is set in the item of Operation Details. In the information two before the last, "18:40" is set in the item of Operation Time and "Mail" is set in the item of Operation Details.

In the example illustrated in FIG. 6, the operation history information 9d indicates that the time at which the user last operated the mobile phone 20 is 20:22. The operation history information 9h indicates that the time at which the user last operated the mobile phone 30 is 18:01. For example, when the carrying state is determined after the time of 20:23, the mobile phone 20 determines its carrying state as a carried state. The mobile phone 30 determines its carrying state as a not-carried state.

The operation history information is not limited to the example of FIG. 6. For example, the operation history information may be configured with only the item of Operation Time or of Operation Details.

Figure 7:
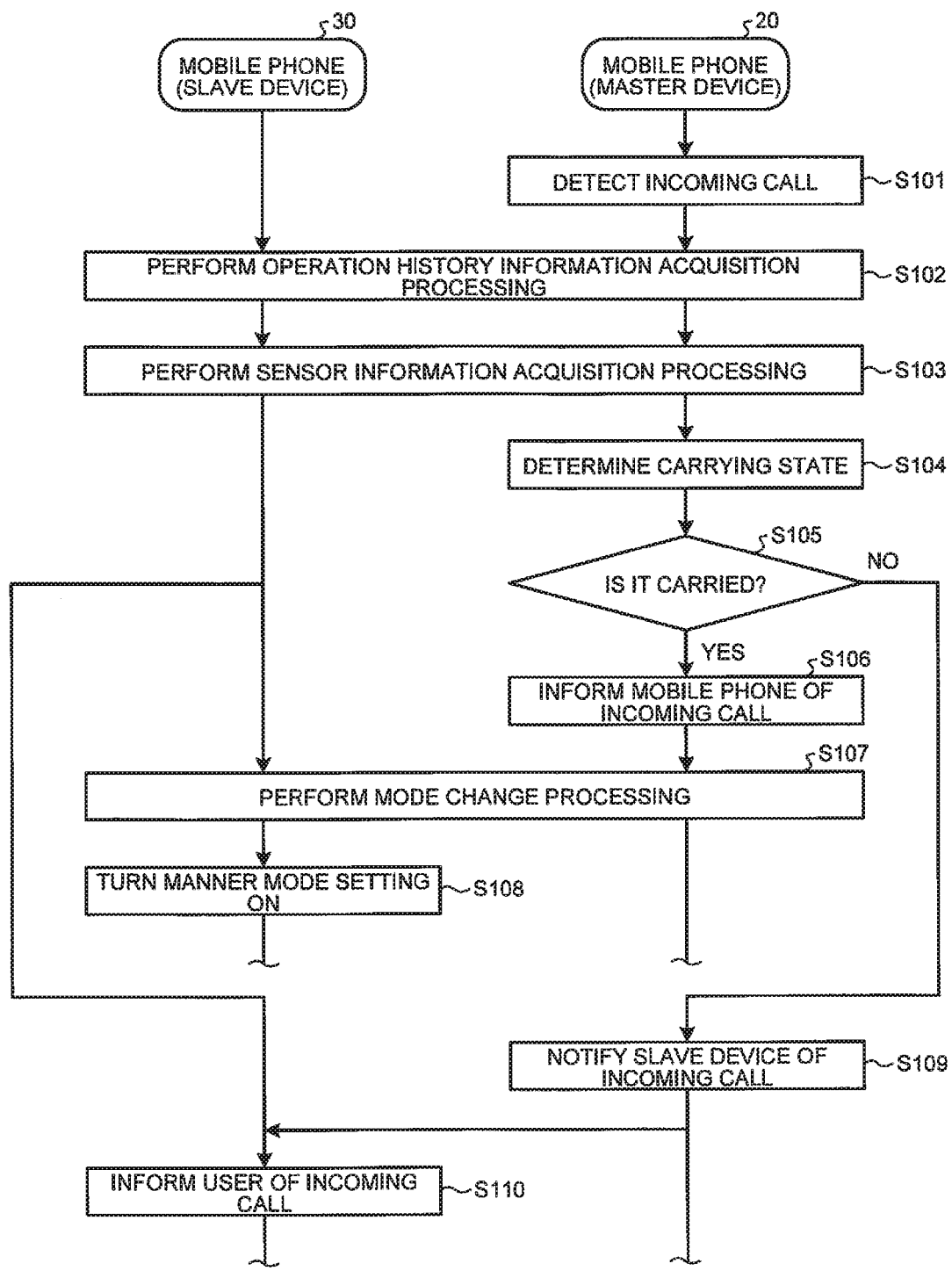
FIG. 7 is a sequence diagram illustrating operations when a master device receives an incoming call.

The operations of the mobile phone 20 and the mobile phone 30 when the master device receives an incoming call will be explained with reference to FIG. 7. FIG. 7 is a sequence diagram illustrating operations when the master device receives the incoming call. In the example illustrated in FIG. 7, the mobile phone 20 is set to the master mode and the mobile phone 30 is set to the slave mode. The operations illustrated in FIG. 7 are executed when the connection-related data 9b of the mobile phone 20 is set so that the mobile phone 20 relays voice data of a communication received by the mobile phone 20 between the caller of the communication and the mobile phone 30. The operation of the mobile phone 20 illustrated in FIG. 7 is implemented by the controller 10 of the mobile phone 20 executing the communication control program 9a. The operation of the mobile phone 30 illustrated in FIG. 7 is implemented by the controller 10 of the mobile phone 30 executing the communication control program 9e.

As illustrated in FIG. 7, the controller 10 of the mobile phone 20 detects an incoming call at Step S101. Then, at Step S102, the controller 10 of the mobile phone 20 performs operation history information acquisition processing. In the present embodiment, the operation history information acquisition processing is processing linked to the controller 10 of the mobile phone 30.

Specifically, the controller 10 of the mobile phone 20 requests the transmission of the operation history from the mobile phone 30 through the short-distance wireless communication performed by the communication module 6b. When receiving the request, the controller 10 of the mobile phone 30 transmits the operation history information 9h to the mobile phone 20 through the short-distance wireless communication performed by the communication module 6b. The controller 10 of the mobile phone 20 stores the received operation history information 9h in the storage 9. The method of transmitting the operation history is not particularly limited. For example, the controller 10 of the mobile phone 30 may be configured so as to transmit only the last operation history to the request source.

Subsequently, at Step S103, the controller 10 of the mobile phone 20 performs sensor information acquisition processing. In the present embodiment, the sensor information acquisition processing is processing linked to the controller 10 of the mobile phone 30.

Specifically, the controller 10 of the mobile phone 20 requests the transmission of the sensor information from the mobile phone 30 through the short-distance wireless communication performed by the communication module 6b. When receiving the request, the controller 10 of the mobile phone 30 reads the sensor information, from the storage 9 or the like, indicating a direction and a magnitude of the acceleration detected by the acceleration sensor 17 during a predetermined retroactive time period from the time when the request is received. The controller 10 of the mobile phone 30 transmits the sensor information to the mobile phone 20 through the short-distance wireless communication performed by the communication module 6b. The controller 10 of the mobile phone 20 stores the received sensor information as the sensor information of the other party in the storage 9 or the like.

Subsequently, at Step S104, the controller 10 of the mobile phone 20 determines the carrying state based on the operation history information and the sensor information of the mobile phone 20 and of the mobile phone 30.

Specifically, the controller 10 of the mobile phone 20 compares the operation history information 9*d* and the operation history information 9*h*, and determines, when the mobile phone 20 is last operated by the user, the carrying state as a carried state. However, when the difference between the time at the determination and the time at the last operation is larger than a threshold, the carrying state may change for the elapsed time from the last operation. In this case, the controller 10 of the mobile phone 20 compares the sensor information of the mobile phone 20 and of the mobile phone 30 with an acceleration pattern of being carried, and determines, when the sensor information of the mobile phone 20 is closer to the acceleration pattern, the carrying state as a carried state. The method of determining the carrying state is not limited thereto. For example, the controller 10 of the mobile phone 20 may be configured so as to determine the carrying state based on either one of the operation history information and the sensor information.

When it is determined that the mobile phone 20 is carried (Yes, at Step S105), then at Step S106, the controller 10 of the mobile phone 20 informs the mobile phone 30 of the incoming call through the processing of a corresponding set mode based on the manner mode setting data 9*c*. At Step S107, the controller 10 of the mobile phone 20 performs the mode change processing. Detailed explanation of the mode change processing will be explained later. The mode change processing is processing linked to the controller 10 of the mobile phone 30. The mode change processing is a processing in which the set master mode is changed to the slave mode and the set slave mode is changed to the master mode. Thereafter, the controller 10 of the mobile phone 20 performs the normal operation for an incoming call.

When the mode is changed, then at Step S108, the controller 10 of the mobile phone 30 turns the manner mode setting ON. Specifically, the controller 10 of the mobile phone 30 registers the value corresponding to a predetermined mode in the manner mode setting data 9*g*. As a result, when the mobile phone 30 is not carried by the user, the mobile phone 30 can automatically turn on the manner mode. This enables the mobile phone 30 to set the manner mode appropriately according to the carrying state.

When it is determined that the mobile phone 20 is not carried (No, at Step S105), then at Step S109, the controller 10 of the mobile phone 20 notifies the slave device (mobile phone 30) of the incoming call through the short-distance wireless communication performed by the communication module 6*b*. At Step S110, the controller 10 of the mobile phone 30 informs the user of the incoming call through the corresponding set mode based on the manner mode setting data 9*g*. Thereafter, the controller 10 of the mobile phone 30 performs the normal incoming call operation.

Figure 8:
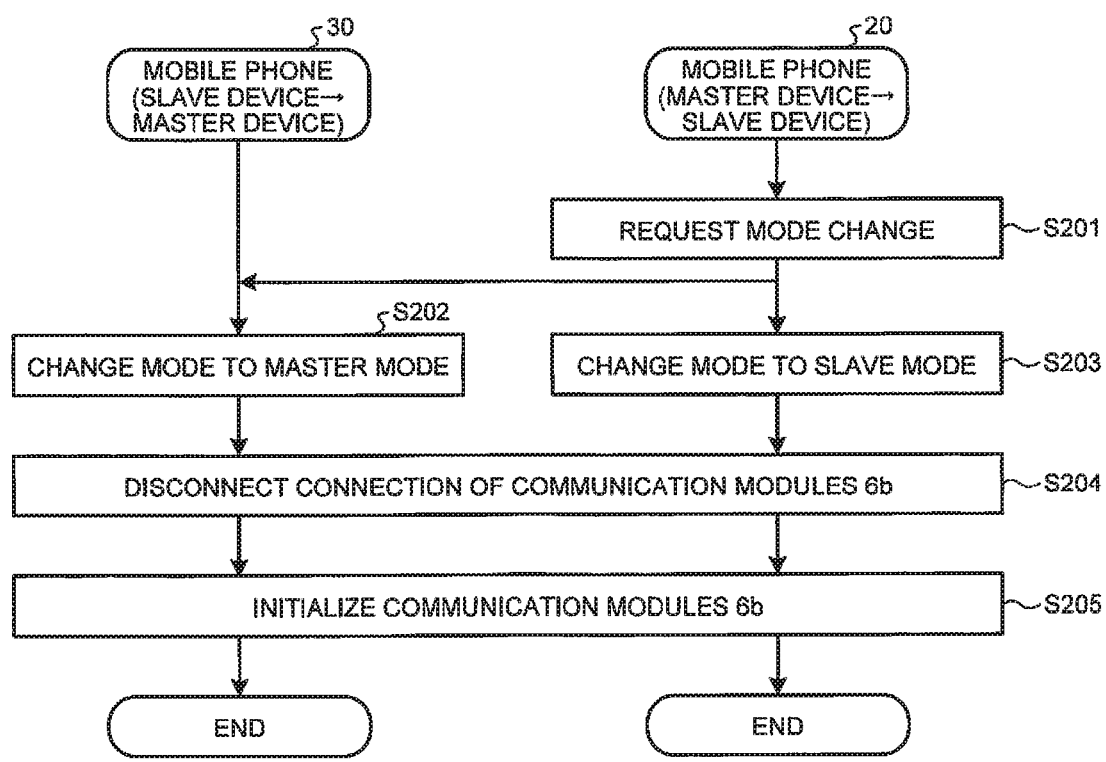
FIG. 8 is a sequence diagram illustrating an example of operations of mode change processing.

The details of the mode change processing illustrated in FIG. 7 will be explained below with reference to FIG. 8. FIG. 8 is a sequence diagram illustrating an example of operations of the mode change processing. The example illustrated in FIG. 8 represents the operations in which the mode of the mobile phone 20 is changed from the master mode to the slave mode and the mode of the mobile phone 30 is changed from the slave mode to the master mode.

As illustrated in FIG. 8, at Step S201, the controller 10 of the mobile phone 20 requests a mode change from the mobile phone 30 set in the slave mode through the short-distance wireless communication performed by the communication module 6*b*. When receiving the request of the mode change, then at Step S202, the controller 10 of the mobile phone 30 changes the own mode of the connection-related data 9*f* to the master mode. When the request of the mode change is completed, then at Step S203, the controller 10 of the mobile phone 20 changes the own mode of the connection-related data 9*b* to the slave mode.

At Step S204, the controllers 10 of the mobile phone 20 and the mobile phone 30 disconnect the connection of the communication modules 6*b*. At Step S205, the controllers 10 of the mobile phone 20 and of the mobile phone 30 initialize the communication modules 6*b* based on the own modes of the connection-related data 9*b* and of the connection-related data 9*f* respectively. As a result, the mobile phone 20 connects the communication module 6*b* to the mobile phone 30 in the slave mode in which the connection is made by being subordinate to the other electronic device. The mobile phone 30 connects the communication module 6*b* to the mobile phone 20 in the master mode in which the connection is made by subordinating the other electronic device. In other words, the master-slave relationship of the communication modules 6*b* between the mobile phone 20 and the mobile phone 30 becomes opposite.

The embodiment disclosed in the present application can be modified within a range that does not depart from the gist and the scope of the invention. Moreover, the embodiment and modifications thereof disclosed in the present application can be combined with each other if necessary. For example, the embodiment may be modified as follows.

The operations of the mobile phone 20 and the mobile phone 30 when the slave device receives an email will be explained with reference to FIG. 9. FIG. 9 is a sequence diagram illustrating operations when the slave device receives the email. In the example illustrated in FIG. 9, the mobile phone 20 is set to the master mode and the mobile phone 30 is set to the slave mode. The operations illustrated in FIG. 9 are executed when the connection-related data 9*f* of the mobile phone 30 is set so that the communication received by the mobile phone 30 is notified to the mobile phone 30 after the mode of the mobile phone 30 is changed to the master mode. The operation of the mobile phone 20 illustrated in FIG. 9 is implemented by the controller 10 of the mobile phone 20 executing the communication control program 9*a*. The operation of the mobile phone 30 illustrated in FIG. 9 is implemented by the controller 10 of the mobile phone 30 executing the communication control program 9*e*.

As illustrated in FIG. 9, the controller 10 of the mobile phone 30 detects an incoming email at Step S301. Then, at Step S302, the controller 10 of the mobile phone 30 performs operation history information acquisition processing. In the present embodiment, the operation history information acquisition processing is processing linked to the controller 10 of the mobile phone 20.

Specifically, the controller 10 of the mobile phone 30 requests the transmission of the operation history from the mobile phone 20 through the short-distance wireless communication performed by the communication module 6*b*. When receiving the request, the controller 10 of the mobile phone 20 transmits the operation history information 9*d* to the mobile phone 30 through the short-distance wireless communication performed by the communication module 6*b*. The controller 10 of the mobile phone 30 stores the received operation history information 9*d* in the storage 9. The method of transmitting the operation history is not particularly limited. For example, the controller 10 of the mobile phone 20 may be configured so as to transmit only the last operation history to the request source.

At Step S303, the controller 10 of the mobile phone 30 performs sensor information acquisition processing. In the present embodiment, the sensor information acquisition processing is processing linked to the controller 10 of the mobile phone 20.

Specifically, the controller 10 of the mobile phone 30 requests the transmission of the sensor information from the mobile phone 20 through the short-distance wireless communication performed by the communication module 6*b*. When receiving the request, the controller 10 of the mobile phone 20 reads the sensor information, from the storage 9 or the like, indicating a direction and a magnitude of the acceleration detected by the acceleration sensor 17 during a predetermined retroactive time period from the time when the request is received. The controller 10 of the mobile phone 20 transmits the sensor information to the mobile phone 30 through the short-distance wireless communication performed by the communication module 6*b*. The controller 10 of the mobile phone 30 stores the received sensor information as the sensor information of the other party in the storage 9 or the like.

At Step S304, the controller 10 of the mobile phone 30 determines the carrying state based on the operation history information and the sensor information of the mobile phone 20 and of the mobile phone 30.

Specifically, the controller 10 of the mobile phone 30 compares the operation history information 9*d* and the operation history information 9*h*, and determines, when the mobile phone 30 is last operated by the user, the carrying state as a carried state. However, when the difference between the time at the determination and the time at the last operation is larger than a threshold, the carrying state may change for the elapsed time from the last operation. In this case, the controller 10 of the mobile phone 30 compares the sensor information of the mobile phone 20 and of the mobile phone 30 with an acceleration pattern when it is of being carried, and determines, when the sensor information of the mobile phone 20 is closer to the acceleration pattern, the carrying state as a carried state.

When it is determined that the mobile phone 30 is not carried (No, at Step S305), then at Step S306, the controller 10 of the mobile phone 30 performs the mode change processing. The mode change processing is processing linked to the controller 10 of the mobile phone 20.

Specifically, the controller 10 of the mobile phone 30 requests the mode change from the mobile phone 20 which is the master device through the short-distance wireless communication performed by the communication module 6*b*. When receiving the request of the mode change, the controller 10 of the mobile phone 20 changes the own mode of the connection-related data 9*b* to the slave mode. When the request of the mode change is completed, the controller 10 of the mobile phone 30 changes the own mode of the connection-related data 9*f* to the master mode. Then, the controllers 10 of the mobile phone 20 and the mobile phone 30 disconnect the connection of the communication modules 6*b*, and, thereafter, initialize the communication modules 6*b* respectively based on the changed own modes.

When the mode change processing is completed, then at Step S307, the controller 10 of the mobile phone 30 notifies the slave device (mobile phone 20) of the incoming email through the short-distance wireless communication performed by the communication module 6*b*. When the own mode is changed to the master mode, then at Step S308, the controller 10 of the mobile phone 30 turns the manner mode setting ON. Specifically, the controller 10 of the mobile phone 30 registers a value corresponding to the predetermined mode in the manner mode setting data 9*g*. In this way, the mobile phone 30 can change the manner mode according to the change of the carrying state.

When the incoming email is notified, then at Step S309, the controller 10 of the mobile phone 20 informs the user of arrival of the email or the like through the processing in the corresponding set mode. Thereafter, the controller 10 of the mobile phone 20 performs the normal operation.

When it is determined that the mobile phone 30 is carried (Yes, at Step S305), then at Step S310, the controller 10 of the mobile phone 30 informs the user of the incoming email through the processing in the corresponding set mode based on the manner mode setting data 9*g*. Thereafter, the controller 10 of the mobile phone 30 performs the normal operation for an incoming email.

As explained above, the mobile phone 30 set in the slave mode determines the carrying state and performs the control related to the master-slave relationship between the communication modules 6*b* based on the result of the determination. Therefore, even if an incoming email is received in the mobile phone 20 not carried by the user, it is possible to discriminate the mobile phone carried by the user from the other and to change the master-slave relationship according to depending on the carrying state. Consequently, the mobile phone 30 eliminates the need for the user to change the master-slave relationship depending on the change of the carrying state, thus improving the user's convenience with respect to the use modes of the electronic devices between which the master-slave relationship is established.

The embodiment and the modifications thereof may further be modified as follows. For example, the programs illustrated in FIG. 4 and FIG. 5 may be divided into a plurality of modules, or may be combined with the other programs.

The embodiment has explained the case where one of the mobile phones notifies the other mobile phone of an incoming call or an incoming email; however, the embodiments are not limited thereto. For example, the embodiments are applied in the case in which one of the mobile phones receives a message via SMS (Short Message Service) and the reception is notified to the other mobile phone.

The embodiment has explained the case where the mobile phone 20 and the mobile phone 30 acquire the operation history information or the like from the other electronic device which is the connection partner when the carrying state is to be determined; however, the embodiments are not limited thereto. For example, the mobile phone 20 and the mobile phone 30 may be configured so as to determine the carrying state based on only the operation history information of the own device. When the carrying state cannot be determined based on only the operation history information of the own device, the mobile phone 20 and the mobile phone 30 may be configured so as to acquire the operation history information or the like from an electronic device which is the connection partner.

The embodiment has explained the case where the mobile phone 20 and the mobile phone 30 determine the carrying state according to detection of the reception; however, the embodiments are not limited thereto. For example, the mobile phone 20 and the mobile phone 30 may be configured so as to determine the carrying state at any time, to determine the carrying state at the time of operation input, and to determine the carrying state at a predetermined time.

The embodiment has explained the case where the method of determining the carrying state is configured so that the last operated mobile phone out of the mobile phone 20 and the mobile phone 30 is determined as the mobile phone carried by the user; however, the embodiments are not limited thereto. For example, the method of determining the carrying state may be a method of determining the carrying state of a mobile phone an idle screen of which does not appear, out of the mobile phone 20 and the mobile phone 30, as the carrying state. For example, the method of determining the carrying state may be a method, in which the carrying state is determined as the not-carried on the case of no operation for a predetermined time after receiving an incoming call in the mobile phone set in the slave mode. In this case, for example, the predetermined time can be set to 30 seconds when an incoming voice call is received and to 1 minute when a mail is received.

The embodiment has explained the case where the mobile phone 20 and the mobile phone 30 acquire the sensor information detected by the acceleration sensor 17; however, the embodiments are not limited thereto. For example, the mobile phone 20 and the mobile phone 30 may add a direction sensor, a gyroscope, and the like to the configurations respectively. In this case, the mobile phone 20 and the mobile phone 30 detect an angle and an angular velocity of a mobile phone using the direction sensor and detect a position of a mobile phone and a change of its attitude using the gyroscope, and can acquire the detection result as sensor information. As a result, it can be expected that the mobile phone 20 and the mobile phone 30 more accurately determine the carrying state.

The embodiment has explained the case where the manner mode of the mobile phone determined as the not-carried, that is, in the master mode is turned ON by the mobile phone 20 or the mobile phone 30; however, the embodiments are not limited thereto. For example, the mobile phone 20 and the mobile phone 30 may be configured so as to change also the manner mode of the mobile phone whose mode is changed to the slave mode according to the change of the carrying state. In this case, the mobile phone 20 and the mobile phone 30 may be configured so that the mobile phone whose mode is changed to the master mode sets a set value of the manner mode which is set at the time of the slave mode in the manner mode of the mobile phone whose mode is changed to the slave mode. The mobile phone 20 and the mobile phone 30 may be configured so as to inform the user that the master-slave relationship is changed by the mobile phone in the slave mode and to cause the user to check and set the settings of the manner mode of the master device and the slave device. Moreover, the mobile phone 20 and the mobile phone 30 may be configured so as to store a table indicating the manner mode depending on the carrying state of the user in the storage 9 or the like and to set the manner mode based on the table.

For example, a case where the user differently uses the mobile phones in such a manner that the mobile phone 30 is used during work time and the mobile phone 20 is used during the private time will be explained below. The mobile phone 20 and the mobile phone 30 previously store a table indicating settings of the manner mode in day and time, etc. The table indicates that the manner mode setting of the mobile phone 30 is prioritized in weekday work hours and the manner mode setting of the mobile phone 20 for private is prioritized in any other hours. In this case, the mobile phone 20 and the mobile phone 30 only have to be configured so as to match the manner mode setting of the other mobile phone with the manner mode setting of its own that prioritizes the hours.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

REFERENCE SIGNS LIST

2 DISPLAY
3 OPERATION PART
6a, 6b COMMUNICATION MODULE
7 RECEIVER
8 MICROPHONE
9 STORAGE
9a, 9e COMMUNICATION CONTROL PROGRAM
9b, 9f CONNECTION-RELATED DATA
9c, 9g MANNER MODE SETTING DATA
9d, 9h OPERATION HISTORY INFORMATION
10 CONTROLLER
11 SPEAKER
15 VIBRATION MODULE
16 LAMP
17 ACCELERATION SENSOR
20 MOBILE PHONE
30 MOBILE PHONE
40 MOBILE PHONE
90 PUBLIC LINE NETWORK
91a, 91b BASE STATION

The invention claimed is:

1. An electronic device comprising:
a first communication device for establishing a master-slave relationship with another electronic device to perform communication;
a second communication device for performing communication via a public network;
an informing device; and
a controller for determining a carrying state and performing control related to the master-slave relationship of the first communication device based on a determination result of the carrying state,
wherein, in response to an incoming communication received by the second communication device, the controller is configured to
in a master mode, cause the first communication device to notify said another electronic device of the incoming communication, and
in a slave mode, cause the informing device to perform notification about the incoming communication on said electronic device.

2. The electronic device according to claim 1, wherein, when it is determined that the carrying state is a carried state,
the controller is configured to make the first communication device subordinate to said another electronic device.

3. The electronic device according to claim 1,
wherein
the controller is configured to perform, based on the determination result of the carrying state, control related to settings of a manner mode in which the incoming communication received by the second communication device is notified without outputting sound from the informing device.

4. The electronic device according to claim 1, wherein,
the controller is configured to determine the carrying state in response to receipt of the incoming communication via the second communication device.

5. The electronic device according to claim 1, wherein
in response to the incoming communication received by the second communication device when said electronic device is in the master mode and it is determined that the carrying state is a carried state, the controller is configured to perform a mode change processing to change said electronic device from the master mode to the slave mode, and in response to the incoming communication received by the second communication device when said electronic device is in the slave mode and it is determined that the carrying state is not a carried state, the controller is configured to perform a mode change processing to change said electronic device from the slave mode to the master mode.

6. The electronic device according to claim 1, wherein
the first communication device is configured to perform two-way communication with said another electronic device through a short-distance wireless communication.

7. The electronic device according to claim 1, wherein the incoming communication includes an email or an SMS (Short Message Service) message.

8. A control method for an electronic device including a first communication device, a second communication device and an informing device, the control method comprising:
establishing, in the first communication device, a master-slave relationship with another electronic device to perform communication;
determining a carrying state and performing control related to the master-slave relationship of the first communication device based on a determination result of the carrying state; and
in response to an incoming communication received by the second communication device,
in a master mode, causing the first communication device to notify said another electronic device of the incoming communication, and
in a slave mode, causing the informing device to perform notification about the incoming communication on said electronic device.

* * * * *